(12) United States Patent
Pollard

(10) Patent No.: US 6,532,203 B1
(45) Date of Patent: *Mar. 11, 2003

(54) CARTRIDGE ENGAGEMENT SYSTEM FOR OPTICAL DISK CARTRIDGES

(75) Inventor: Christopher Anthony Pollard, Monument, CO (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 08/456,762

(22) Filed: Jun. 1, 1995

Related U.S. Application Data

(63) Continuation of application No. 08/183,688, filed on Jan. 18, 1994, now Pat. No. 5,450,391.

(51) Int. Cl.$^7$ .............................................. G11B 17/04
(52) U.S. Cl. ....................................................... 369/191
(58) Field of Search ........................... 369/191, 34, 36, 369/77.2, 270; 360/92; 294/110.1, 116, 106; 901/31, 39

(56) References Cited

U.S. PATENT DOCUMENTS

| | | | | | |
|---|---|---|---|---|---|
| 5,014,255 A | * | 5/1991 | Wanger et al. | ................. | 369/36 |
| 5,128,912 A | * | 7/1992 | Hug et al. | ..................... | 369/36 |
| 5,450,391 A | * | 9/1995 | Pollard | ........................ | 369/191 |

FOREIGN PATENT DOCUMENTS

| | | | | |
|---|---|---|---|---|
| SU | 1298176 | * | 3/1987 | ................. 294/106 |

* cited by examiner

Primary Examiner—Allen Cao
(74) Attorney, Agent, or Firm—Harold T. Fujii

(57) ABSTRACT

A disk cartridge engagement system having a carriage disposed within a sleeve for movement in the longitudinal direction, gripper arms pivotally mounted to the carriage for engaging a disk cartridge positioned distally of the sleeve, and a pair of biasing springs movable between first and second biasing conditions which correspond to gripping and releasing of the cartridge, respectively.

12 Claims, 15 Drawing Sheets ly storing information. Optical disks are an increasingly popular medium for digitally storing information. Optical disks are typically enclosed in box shaped disk cartridges having two notches formed near one end of the cartridge, with one notch located on each long side.

CARTRIDGE ENGAGEMENT SYSTEM FOR OPTICAL DISK CARTRIDGES

This is a continuation of application Ser. No. 08/183,688, filed Jan. 18, 1994. U.S. Pat. No. 5,450,391.

FIELD OF THE INVENTION

The present invention relates to an apparatus for retrieving a cartridge, such as an optical disk cartridge, from a storage array so that the cartridge may be moved to an alternate location.

BACKGROUND OF THE INVENTION

Optical disks are an increasingly popular medium for digitally storing information. Optical disks are typically enclosed in box shaped disk cartridges having two notches formed near one end of the cartridge, with one notch located on each long side.

In some large-scale optical disk storage and retrieval systems, disks are stored in an array of storage slots, with each slot positioned vertically of the other slots to form a column. The storage systems often have several such columns arranged laterally of each other to form a two dimensional array of slots. The systems include disk retrieval mechanisms which use gripping means to retrieve a selected cartridge from its storage slot, transfer the cartridge to a disk reader, and to subsequently return the cartridge to its slot when instructed to do so. The gripping means normally grips the cartridge by engaging with the notches located on the side of the cartridge.

One necessary feature in the design of cartridge retrieval and return systems is a gripping means that is convertible between a retrieval mode, in which the gripping means is capable of engaging and carrying a disk cartridge, and a return mode in which the gripping means releases the disk cartridge so that it may be returned to its storage location. One presently available cartridge retrieval mechanism, described in U.S. Pat. No. 5,014,255, utilizes a pair of gripping arms proportioned for engaging the notches located on the sides of a disk cartridge. The gripping arms are pivotally mounted to a carriage which travels towards the disk cartridge. A spring biases the gripping arms inwardly such that when forward advancement of the carriage causes them to abut the end of a disk cartridge, the edges of the cartridge urge them laterally outward until they slip inwardly into engagement with the notches on the cartridge. The gripper arms and the carriage are disposed between a pair of rectangular plates which are connected at one end and which are proportioned to fit a retrieved cartridge between them.

A disadvantage with the currently available disk cartridge retrieval systems such as the one described above is that proper positioning of the gripper arms is conditioned upon proper positioning of guide members that move independently of the gripper arms. The change in position of the guide members that is needed to properly position the gripper arms is triggered by movement of the carriage and is only on the order of a few millimeters. Accurate positioning of each gripper arm is contingent upon successful travel of a small peg attached to that gripper arm through one of a series of narrow channels. Each peg is guided into the appropriate channel by proper positioning of one of the guide members. The device is thus highly tolerance-dependent, has an increased likelihood of malfunction caused by improper alignment of moving parts, and is expensive to construct in such a way as to achieve adequate precision.

Yet another disadvantage with currently available systems is that the components used for biasing the gripper arms are configured such that excessive force is exerted on the biasing spring when the gripper arm is pivoted laterally of the carriage during ejection of a cartridge. The force on the biasing spring increases well above the normal spring rate and thereby exposes the spring and other components to substantial forces that can precipitate premature wear.

SUMMARY AND OBJECTS OF THE INVENTION

It is an object of the present invention to provide an improved cartridge engagement system which is less tolerance-dependent than currently available systems so as to allow for relatively inexpensive top-down assembly and decreased likelihood of malfunction. It is another object of the present invention to provide an improved cartridge engagement system having a gripper arm biasing mechanism that will minimize stresses on components and that will therefore increase the longevity of component parts.

The present invention is intended for use with a carriage slidable along a longitudinal path formed in a base. A pair of gripping arms are pivotally mounted on the carriage, with their distal ends extending distally from the carriage. The gripping arms are configured such that when they are advanced against the cartridge positioned at the distal end of the longitudinal path, they will deflect laterally around the proximal corners of the cartridge until they engage the notches formed in the cartridge.

Biasing springs are connected to the gripping arms so as to bias the gripping arms in one of two different biasing conditions. In the first biasing condition, the gripping arms are biased towards each other so that when advanced against a cartridge they will deflect into engagement with the notches as described above. In the second biasing condition, the gripping arms are biased outwardly and are thus unable to engage or remain engaged with a cartridge.

A pair of setting components, each of which is connected to one end of a biasing spring, are mounted to the carriage. During longitudinal travel of the carriage, the setting components collide with camming members extending into the longitudinal path of the carriage. The camming members move the setting components laterally outward into a first position or laterally inward into a second position, depending upon the direction of travel of the carriage. When the carriage travels in the proximal direction, the camming members close a gap between the setting components and thereby cause the biasing springs to pivot into a second spring orientation which produces the second biasing condition. During travel in the distal direction, the camming members separate the setting components, thereby causing the biasing members to pivot into a first spring orientation which will produce the first biasing condition.

In a preferred embodiment, additional camming components are mounted to the base which catch the gripper arms and pivot them to a laterally extending position during ejection of the cartridge and which again catch the gripper arms to pivot them back into the distally extending position during the withdrawal of the carriage which follows ejection. The biasing springs are configured such that pivoting the gripper arms into the laterally extending position does not oppose the direction of bias but instead alters it so as to minimize stresses on the springs and surrounding parts. An additional spring is connected between each gripper arm and its corresponding biasing spring to prevent abrupt rotation of the gripper arm between the distally extending and laterally extending positions.

DETAILED DESCRIPTION OF THE PREFERRED EMBODIMENT

Figure 1:
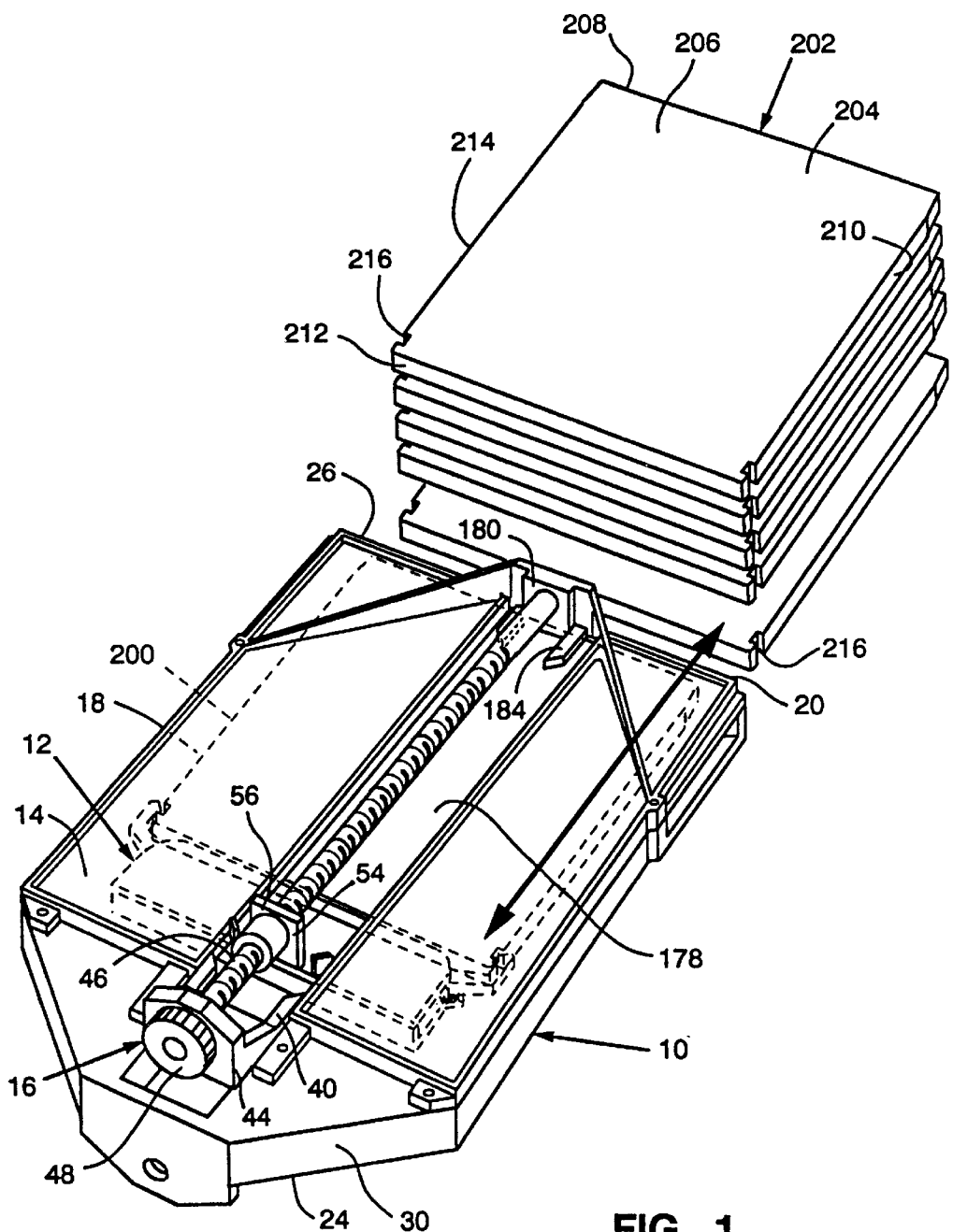
FIG. 1 is a perspective view of the cartridge engagement system of the present invention schematically showing the device positioned facing an array of disk cartridges after having retrieved one of the cartridges.

As shown in FIG. 1, the apparatus is comprised generally of a base 10, a carriage 12, a top plate 14, and a worm-screw assembly 16 for advancing and withdrawing the carriage 12 longitudinally along the base 10. The top plate 14 and the base 10 are joined to form a cartridge-receiving sleeve 18 having a space between the top plate and base of sufficient size and shape to hold a cartridge 200. The distal end 20 of the sleeve 18 is open, and the apparatus is configured to be positioned with the open distal end 20 of the sleeve 18 facing an array 202 of cartridges. As is well known, each cartridge 204 in the array is comprised of two parallel rectangular faces 206 which correspond to the top and bottom of the disk, four thin rectangular faces 208, 210, 212, and 214 which surround the disk, and a pair of notches 216 formed near the proximal end of opposing rectangular faces 210, 214.

Figure 11:
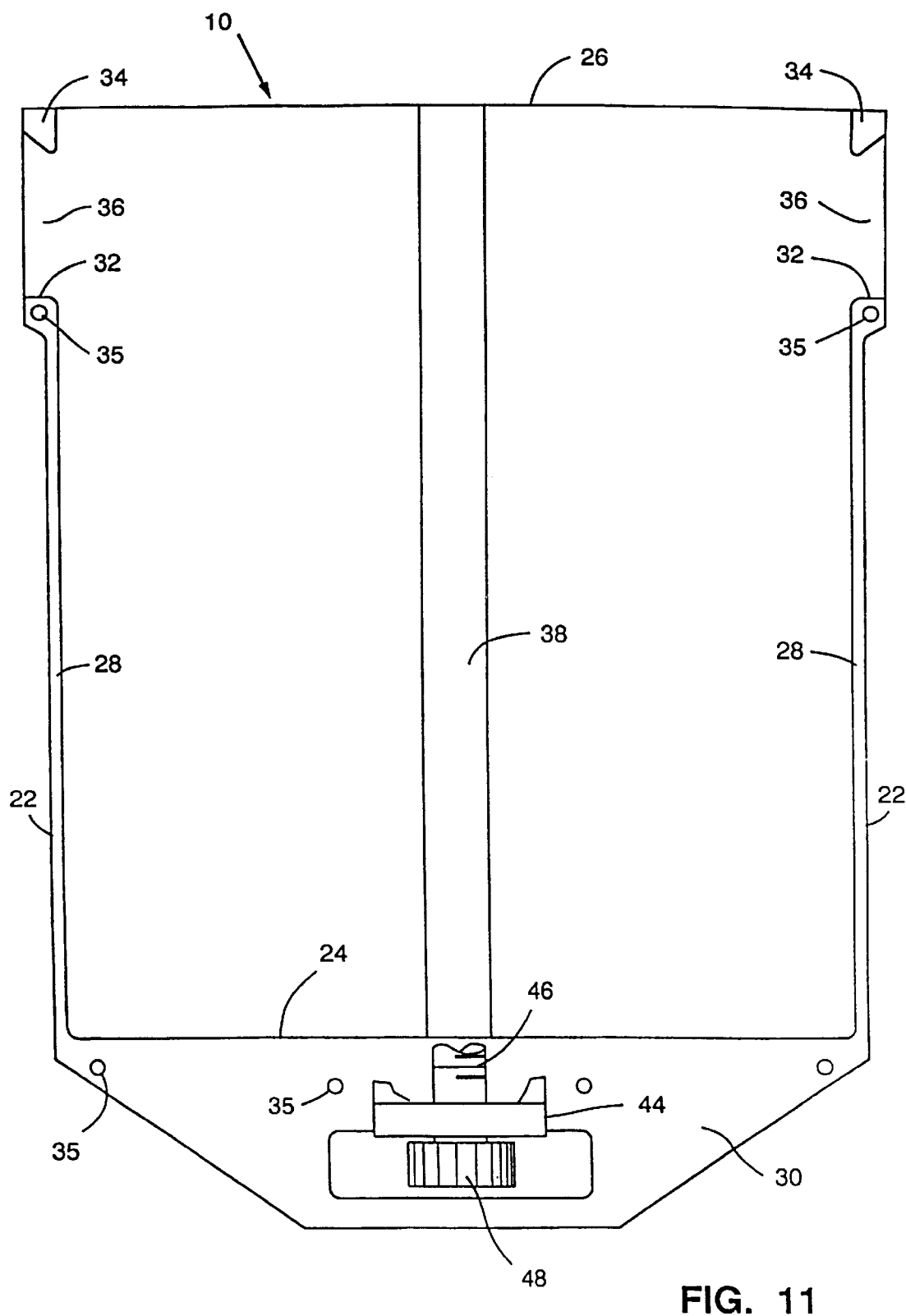
FIG. 11 is a top plan view of the base of the preferred cartridge engagement system of FIG. 2.

Referring to FIG. 11, the base 10 has a rectangular portion having a pair of long sides 22 and a pair of short sides 24, 26 perpendicular to the long sides. First walls 28 line the long sides 22 and a skirt 30 is connected to the short side 24 at the proximal end of the base 10. The first walls 28 have distal ends 32 that terminate proximal of the short side 26. Beveled cams 34 are secured to the distal end of the base 10 along the long sides 22 to form spaces 36 between the distal ends 32 of the first walls 28 and the cams 34. A longitudinal groove 38 in the base 10 is parallel to the long sides 22 and is located midway between them. Several bore holes 35, proportioned for receiving screws (not shown) are spaced along the perimeter of the base 10.

Referring again to FIG. 1, on the skirt 30 at the proximal end of the base 10 is a first worm screw mount 44 for holding a worm screw 46 and a gear 48 for rotating the worm screw 46 when engaged with a motor (not shown).

Figure 13:
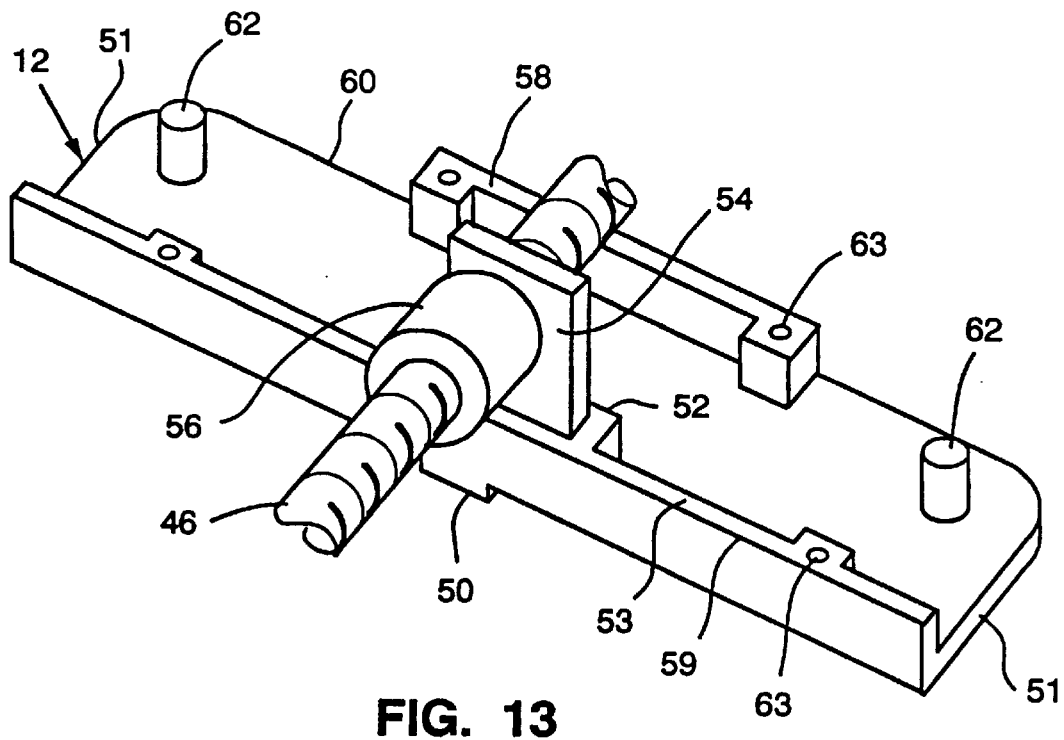
FIG. 13 is a perspective view showing the carriage of the preferred cartridge engagement system with the gripper arm assemblies and the setting components removed.
Figure 14A:
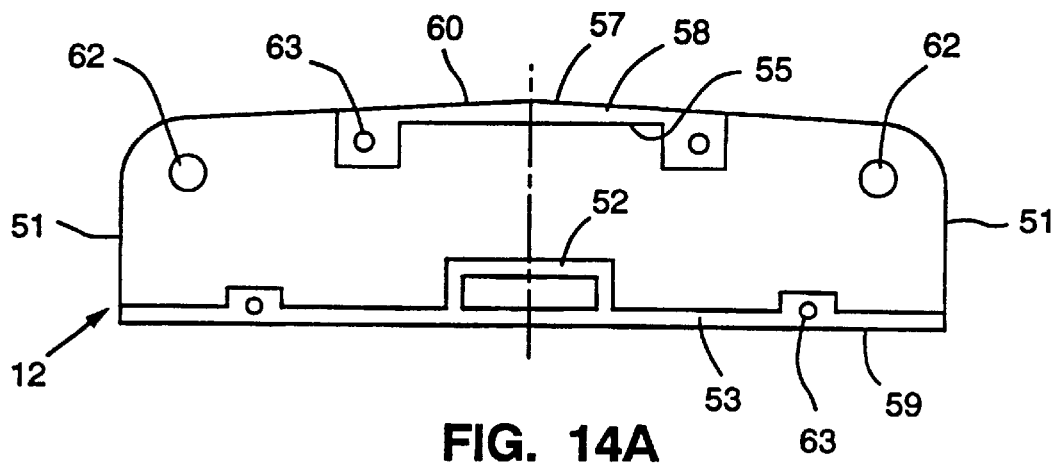
FIG. 14A is a top plan view of the carriage of the preferred cartridge engagement system with the gripper assemblies and the setting components removed.

Referring to FIGS. 13 and 14A, the carriage 12 is substantially rectangular, having substantially parallel short sides 51, a proximal side, 59, and a distal side 60. A first wall 53 lines proximal side 59, and centered along first wall 53 is a second mount 54 which is connected to the carriage 12 for supporting a worm screw receiver 56. Bore holes 63, proportioned for receiving screws (not shown) are formed in walls 58 and 53. The worm screw receiver has a threaded bore for engaging with the threads on the worm screw 46.

A second wall 52 which is parallel to first wall 53 is positioned adjacent to second mount 54. Third wall 58, is centered along the distal edge 60 of the carriage 12. Third wall 58 has a proximal side 55 that is parallel to walls 52, 53 and a distal side 57 that is curved slightly outward at its center. A rectangular member 50 is centered on the underside of the carriage 12 and is slidably positioned within the groove 38 in the base 10 (see FIG. 11). Two identical posts 62 are mounted to the carriage 12, each positioned on an opposite side of the carriage.

Figure 14B:
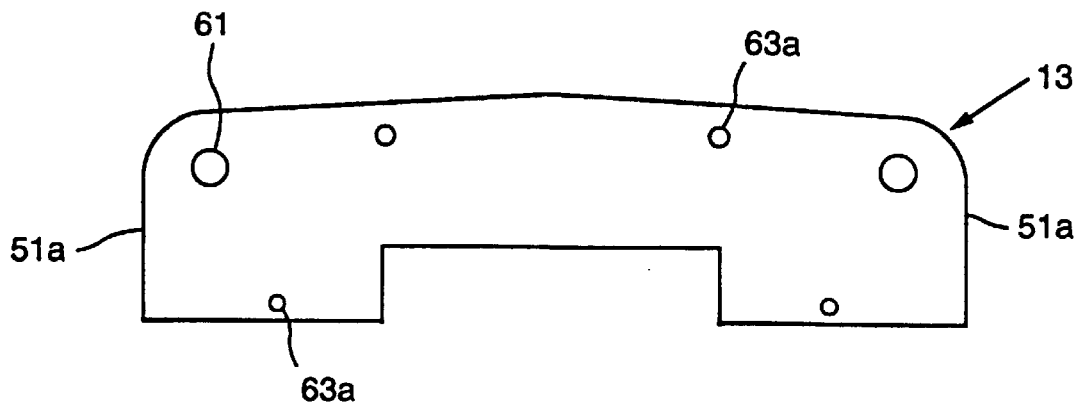
FIG. 14B is a top plan view of a carriage plate of the preferred cartridge engagement system.

A carriage plate 13, shown separately in FIG. 14B, is fastened to the top of the carriage 12. The carriage plate 13 is provided with a set of holes 63a corresponding to the bore holes 63 on the carriage 12. When the carriage plate is secured to the carriage, screws (not shown) pass through the holes 63, 63a. A pair of sides 51a on the carriage plate 13 correspond to sides 51 of the carriage 12. A pair of spaced holes 61 is formed in the carriage plate 13 for receiving the posts 62 in the carriage 12.

Figure 3:
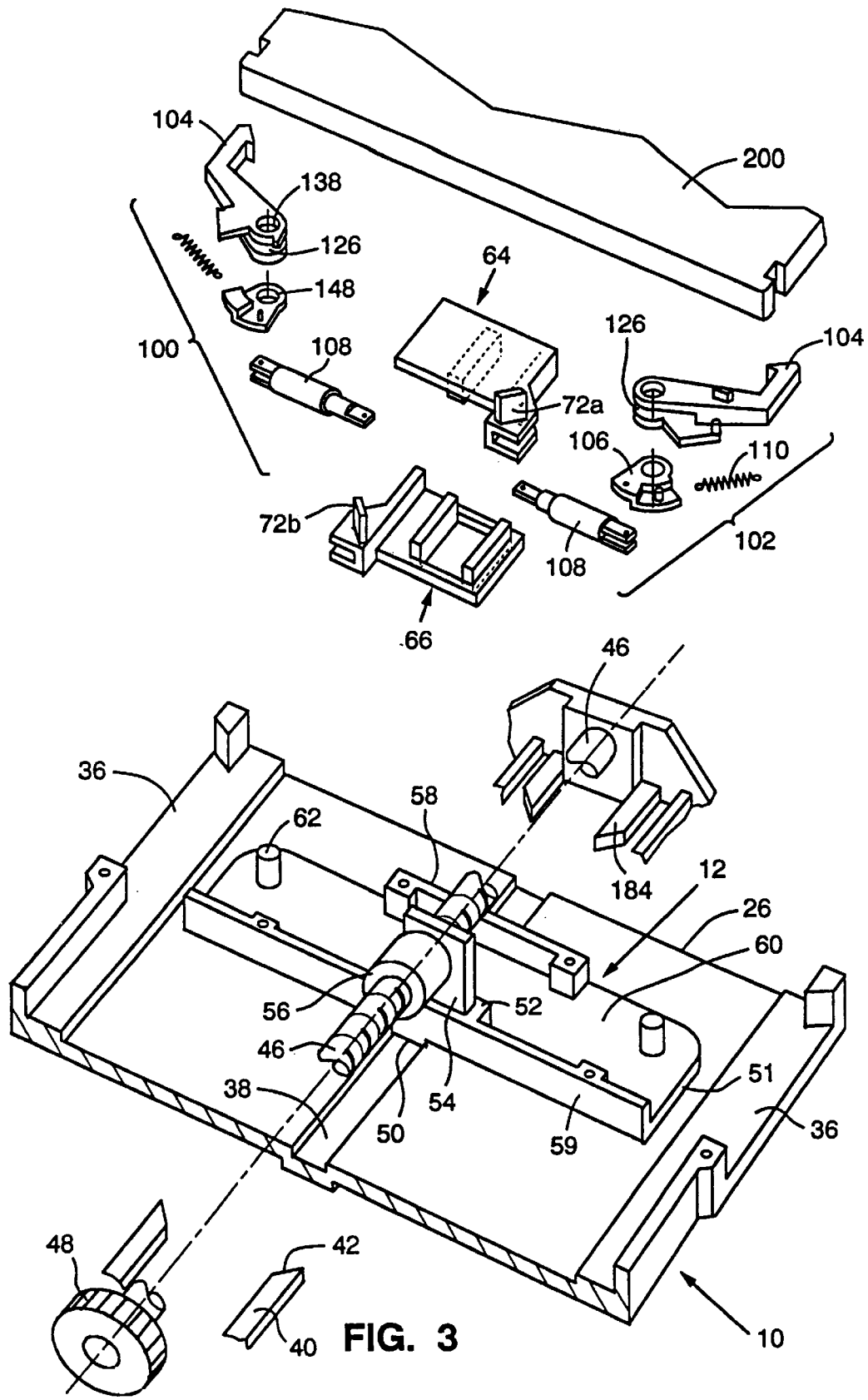
FIG. 3 is a partial perspective view of the preferred cartridge engagement system of FIG. 2 showing a portion of the base with the carriage mounted thereon and further showing in exploded view the gripper arm assemblies and the setting components.
Figure 4:
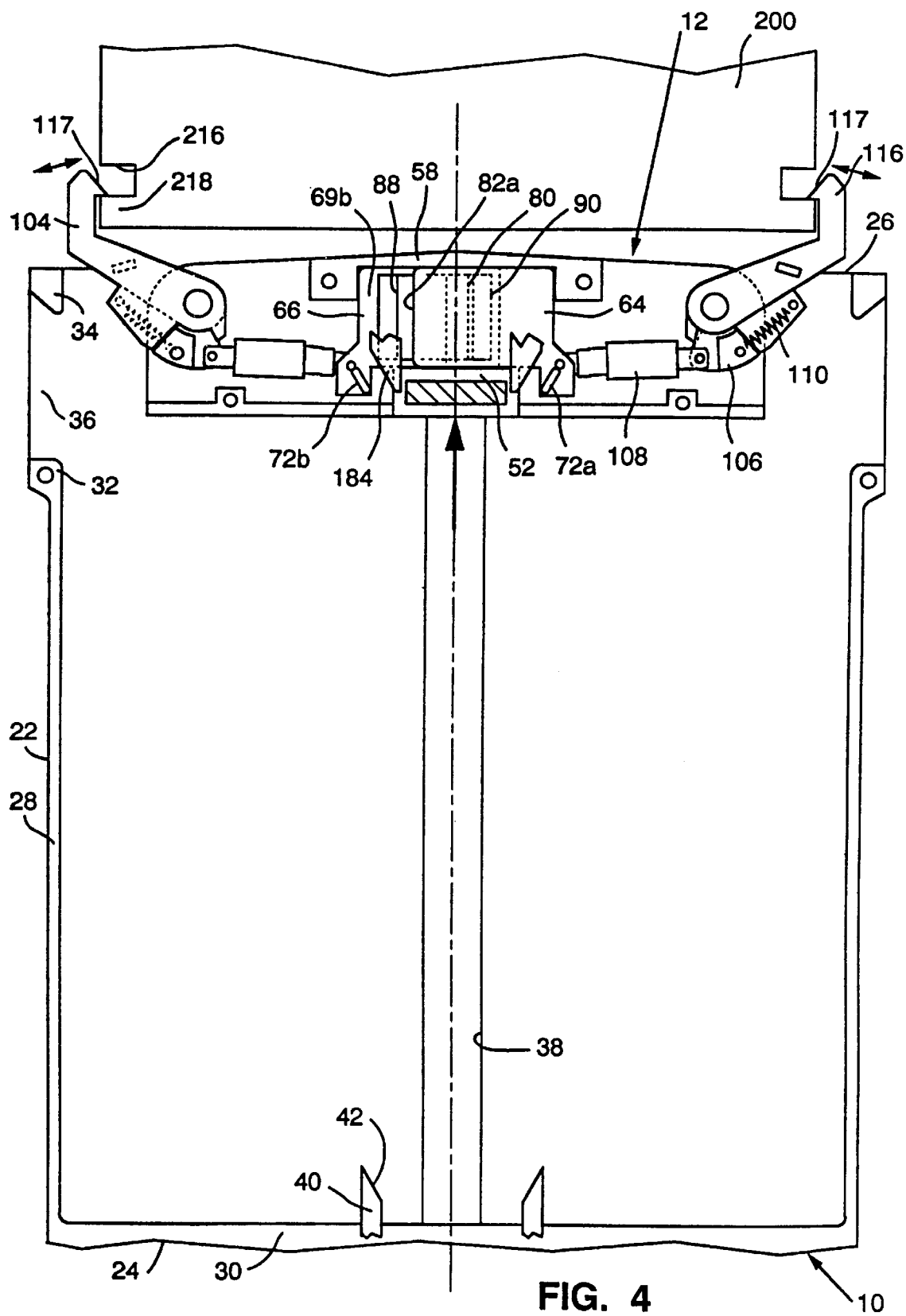
FIG. 4 is a top plan view of the preferred cartridge engagement system of FIG. 2 with a portion of the top plate removed to show the gripper arms engaging a disk cartridge.
Figure 19:
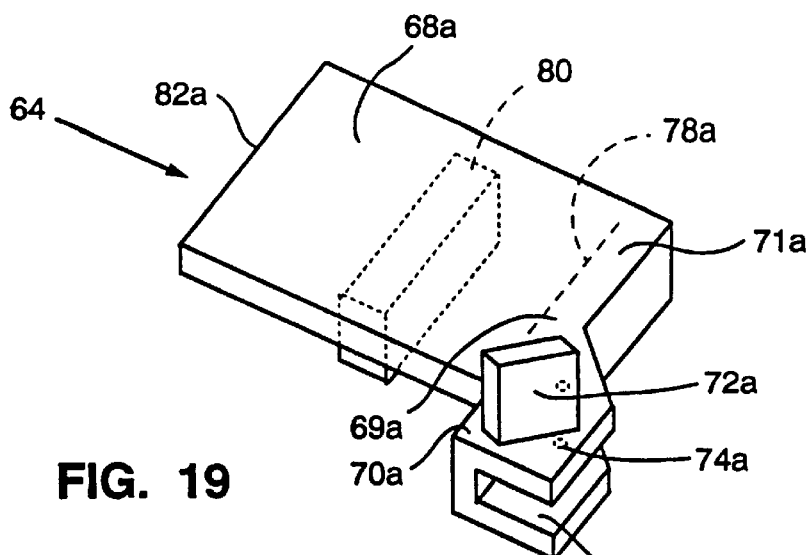
FIGS. 19 and 20 are perspective views of the setting components of the preferred cartridge engagement system.
Figure 20:
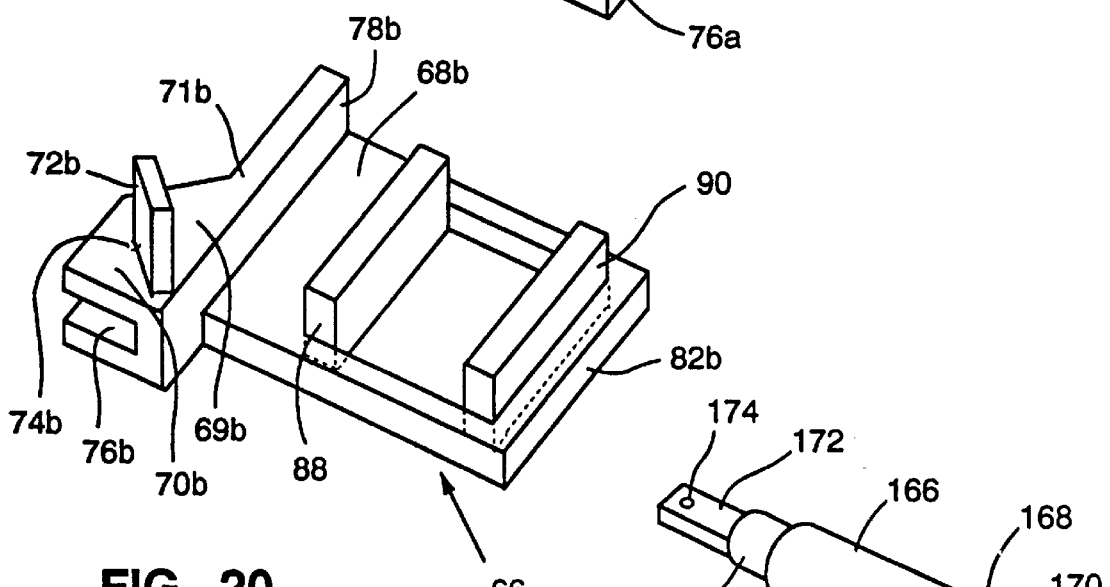

As shown in FIG. 4, a pair of laterally movable setting components 64, 66 are located between wall 52 and wall 58. The exploded view of FIG. 3 and the separate views of FIGS. 19 and 20 show setting components 64, 66 isolated from the rest of the carriage 12. Setting component 64 (FIG. 19) consists of a rectangular first portion 68a and a smaller but thicker second portion 69a that are joined at wall 78a of portion 69a. Second portion 69a is comprised of a substantially rectangular section 71a which broadens at one end into broadened section 70a. On the topside of broadened section 70a is a diagonally-oriented camming wall 72a. A bore 74a passing through broadened section 70a in the normal direction is proportioned for receiving a pin (not shown). A slot 76a which is substantially parallel to the plane of the rectangular first portion 68a is formed within the broadened section 70a. A magnet 80 is centered on the rectangular first portion 68a between the wall 78a of second portion 69a and edge 82a of first portion 68a.

Setting component 66 (FIG. 20) is similar to setting component 64 except that it is positioned on the carriage 12 in inverted fashion such that wall 78b extends from the top side of rectangular portion 68b rather than from its underside. Moreover, rather than having a magnet 80, setting component 66 has a pair of parallel bars 88, 90 of metallic material secured to its top side. Camming wall 72b, slot 76b and bore 74b on setting component 66 are mirror images of their counterparts, 72a, 76a, and 74a, respectively, on setting component 64.

Figure 5:
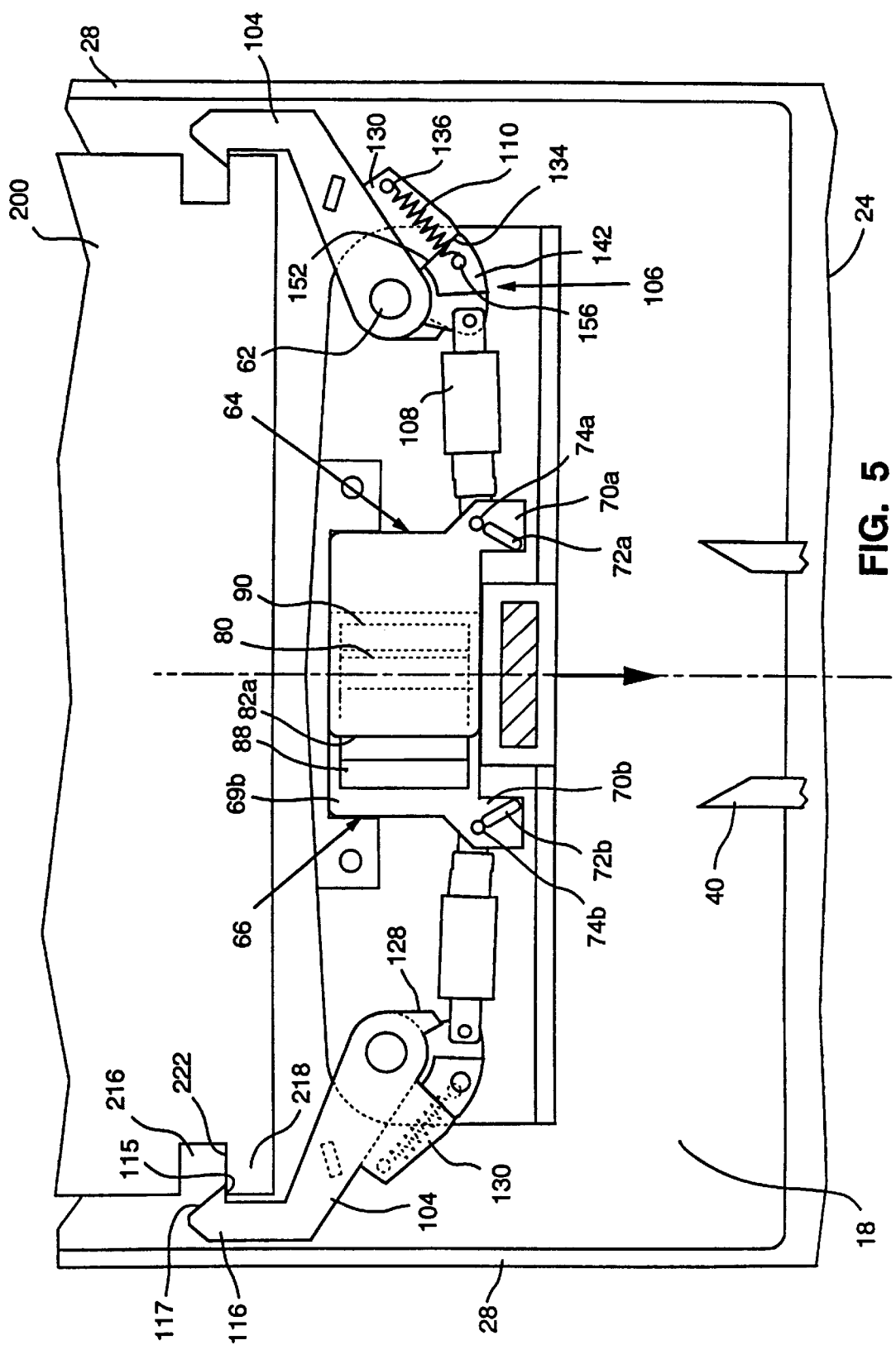
FIGS. 5–10 are a series of partial top plan views showing retrieval and discharge of a disk cartridge by the preferred cartridge engagement system of FIG. 2.
Figure 6:
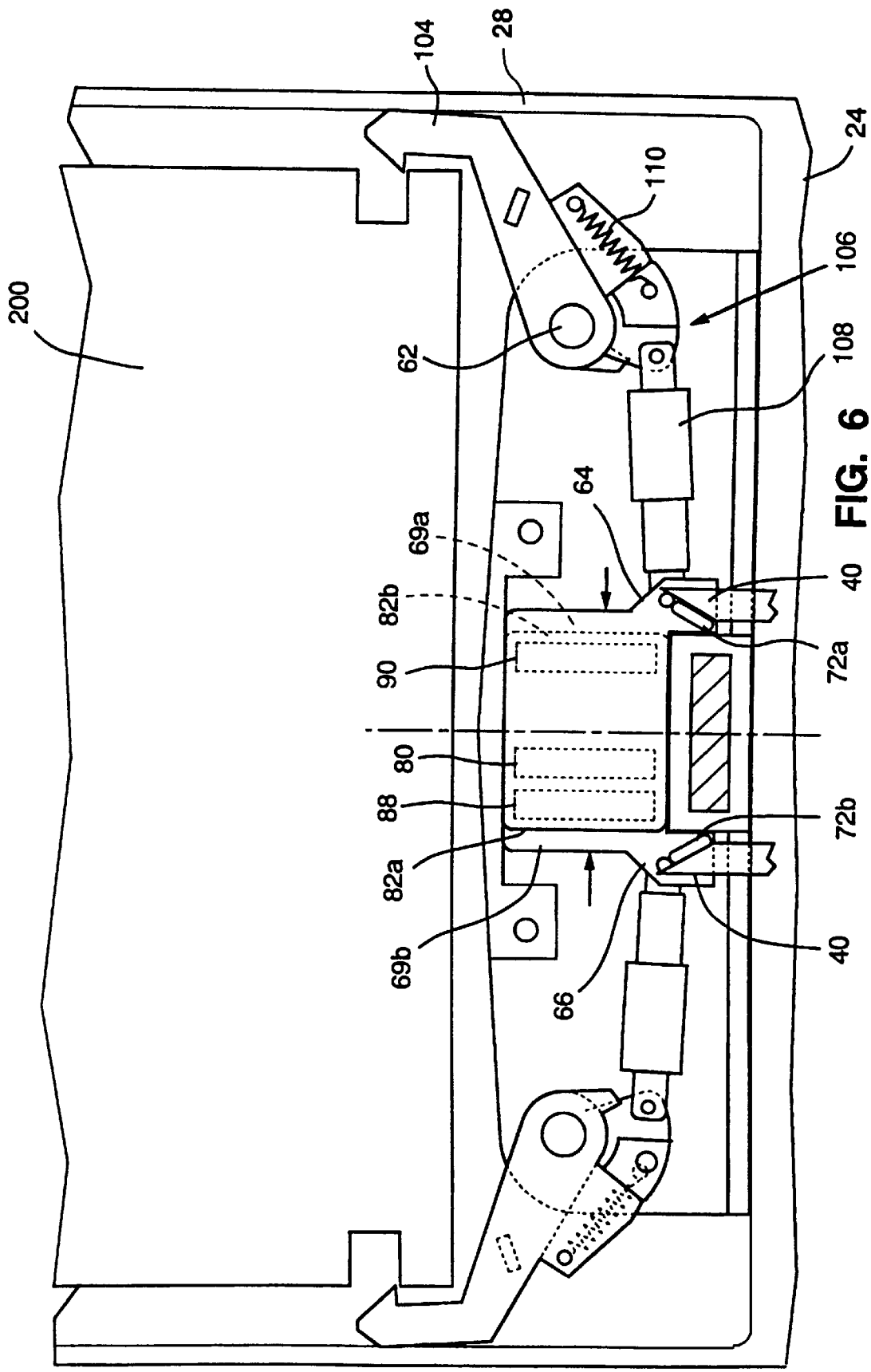

When assembled, setting components 64, 66 are positioned such that setting component 64 is positioned above setting component 66 with the magnet 80 positioned between the magnetic bars 88, 90 as shown in FIGS. 4–6. The setting components 64, 66 are laterally moveable between first and second positions. In the first position, shown in FIG. 5, magnet 80 and magnetic bar 90 are held adjacent by the magnetic attraction between them, and the setting components 64, 66 are slightly separated, with portion 69b of setting component 66 spaced from wall 82a of setting component 64. In the second position, shown in FIG. 6, magnet 80 and bar 88 are held adjacent by the magnetic attraction between them, causing setting components 64, 66 to be positioned such that portion 69b of setting component 66 is adjacent to wall 82a of setting component 64 and portion 69a of setting component 64 is adjacent to wall 82b of setting component 66. The setting components 64, 66 may be moved between the first and second positions by applying to camming walls 72a, 72b a sufficient force to overcome the magnetic force between the magnet 80 and the bar of magnetic material, 88 or 90, to which it is magnetically attached.

Figure 2:
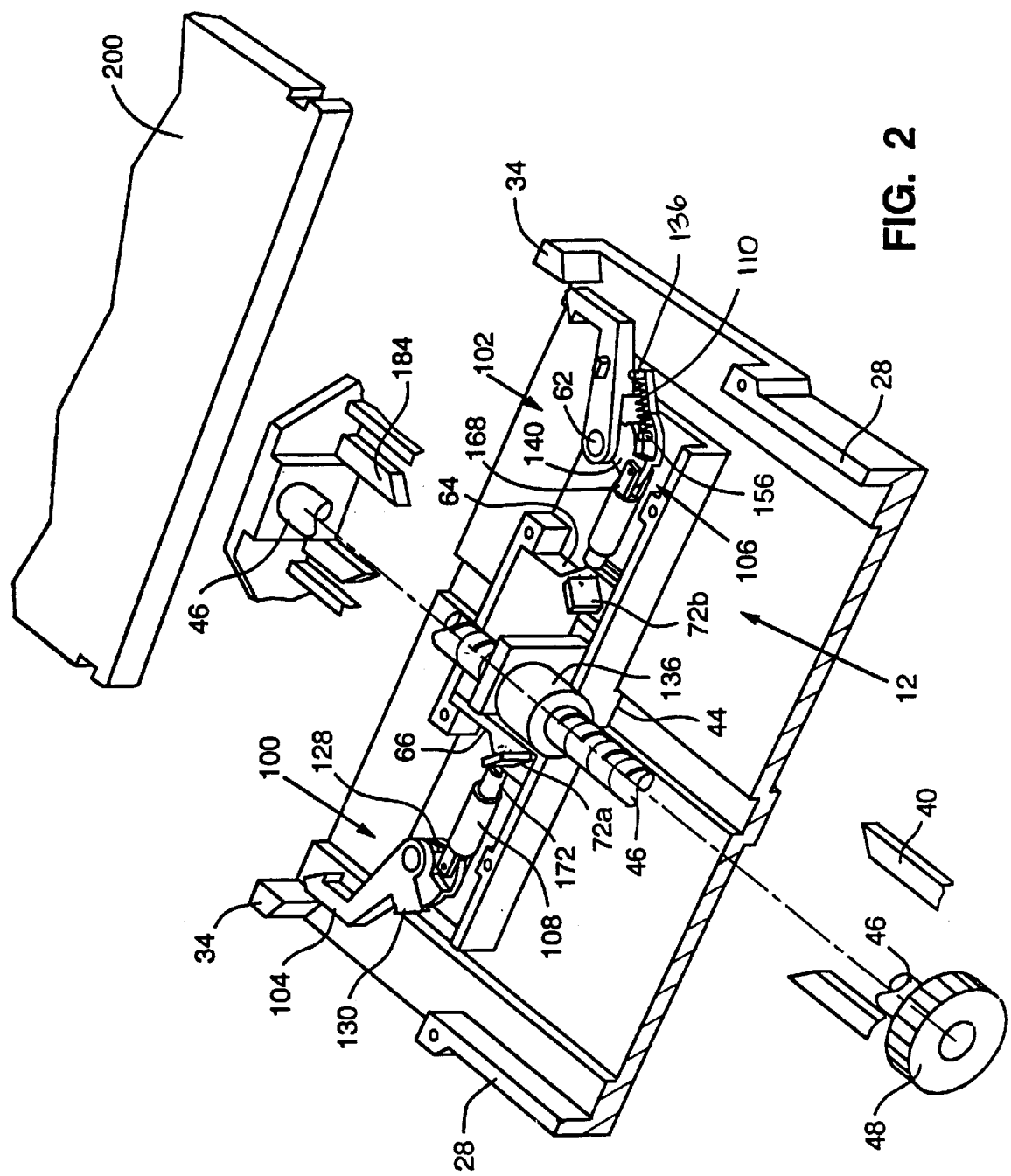
FIG. 2 is a partial perspective view of a preferred cartridge engagement system according to the present invention showing the gripper arm assembly positioned for retrieving a disk cartridge.

Referring to FIGS. 2 and 3, first and second gripper arm assemblies 100, 102 are positioned on opposite sides of the carriage 12. The first and second gripper arm assemblies are identical to each other but are positioned such that the components on the top side of assembly 100 are on the underside of assembly 102 and visa versa. The gripper arm assemblies will be described with reference to the second gripper arm assembly 102 only. Because components that are located on the underside of the second gripper arm assembly 102 have their identical counterparts on the top side of the first gripper arm assembly 100, components identified as appearing on the underside of the second gripper arm assembly 102 can be located on the figures by reference to first gripper arm assembly 100.

Figure 15:
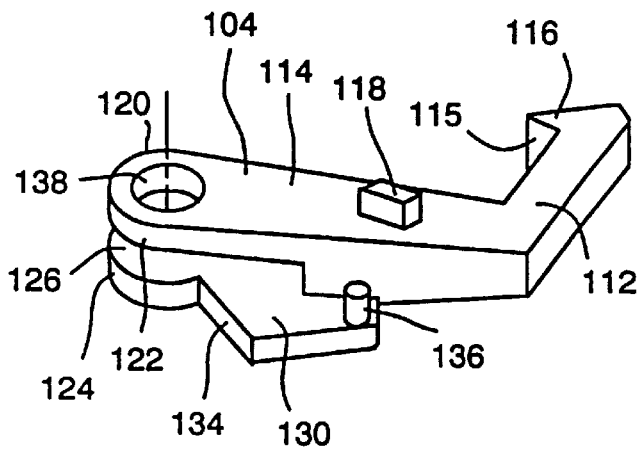
FIGS. 15 and 16 are a perspective view and a top plan view, respectively, of a gripper arm of the preferred cartridge engagement system.

As shown in FIG. 3, the gripper arm assembly 102 is comprised generally of a gripper arm 104, a pivot member 106, a compression spring 108, and a tension spring 110. Referring to the isolated views of gripper arm 104 in FIGS. 15 and 16, the gripper arm 104 is comprised of a first straight section 112 and a second straight section 114 joined at an angle. The first straight section 112 is formed into a hook 116 having a beveled surface 117 and a hooking surface 115. An angled stop 118 is secured to the upperside of straight section 114.

The proximal end 120 of second straight section 114 is divided into parallel upper 122 and lower 124 plates which have a slot 126 between them. First and second pivot cams 128, 130 having camming surfaces designated 132 and 134, respectively, protrude laterally from the lower plate 124. A peg 136 extends normally of second pivot cam 130. A bore 138 passes through plates 122 and 124.

Figure 17:
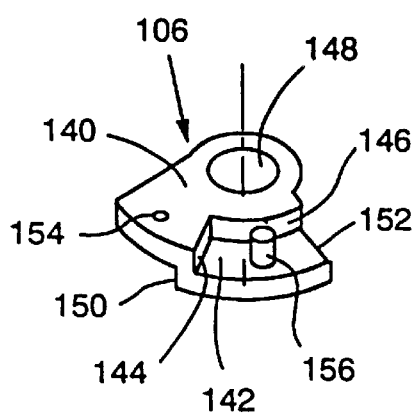
FIGS. 17 and 18 are a perspective view and a top plan view, respectively, of a pivot member of the preferred cartridge engagement system.
Figure 18:
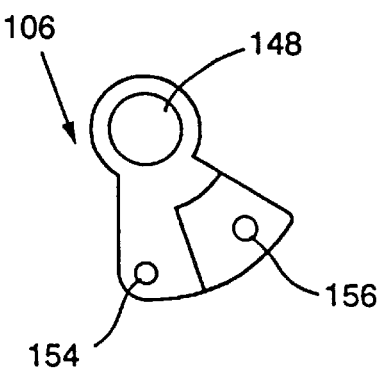

The pivot member 106, shown in isolation in FIGS. 17 and 18, is comprised of a pair of surfaces, designated 140 and 142, occupying parallel planes and joined by a pair of substantially vertical walls 144, 146, such that surface 142 is recessed below surface 140. A first bore 148 passes through surface 140 and corresponds in size to bore 138 on the gripper arm 104 (see FIG. 6). A second bore 154, proportioned for receiving a pin (not shown) also passes through surface 140. A peg 156 protrudes vertically from surface 142. Opposite walls of recessed surface 142 form first and second camming walls 150, 152.

When the gripper assembly 102 is assembled the pivot member 106 is disposed in the slot 126 between plates 122 and 124 of the gripper arm 104 (FIG. 15) and the pivot member 106 and gripper arm 104 are pivotally mounted to the carriage 12 with pivot post 62 (FIG. 13) passing through their bores 138, 148. Camming walls 150, 152 of pivot member 106 correspond to pivot cams surfaces 132, 134 on the gripper arm 104. Thus, when the gripper arm 104 pivots in the counterclockwise direction, pivot cam surface 132 pushes camming wall 150 to rotate pivot member 106 in the same direction, and when the gripper arm 104 pivots in the counterclockwise direction pivot cam surface 134 engages camming wall 152 to rotate pivot member 106 in that direction.

Referring to FIG. 5, a compression spring 108 is connected at one end to portion 70a of setting component 64 and at the other end to pivot member 106. As will be described below, movement of the setting components 64, 66 changes the orientation of compression spring 108 and thereby alters the biasing state imposed on the gripping arms 104 by the spring 108.

Figure 21:
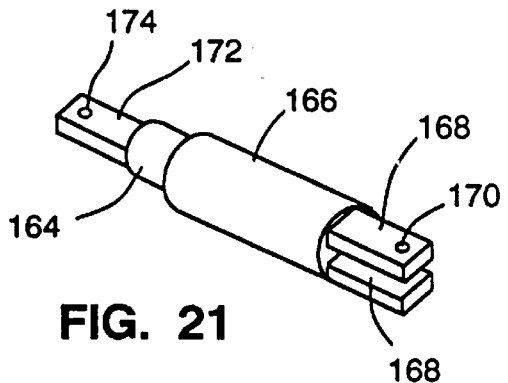
FIGS. 21 and 22 are a perspective view and a side section view, respectively, showing a compression spring of the preferred cartridge engagement system.
Figure 22:
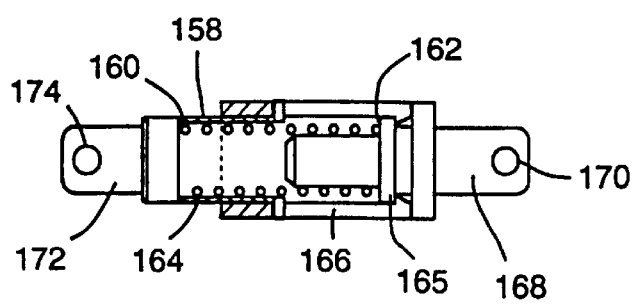

Compression spring 108, shown separately in FIGS. 21 and 22, is comprised of a spring 158 having first and second ends 160, 162. First end 160 is positioned within a first spring casing 164 and second end 162 is positioned against a shoulder 165 disposed within a second spring casing 166. Second spring casing 166 is disposed around the first casing and is slidable in a longitudinal direction relative to the first casing when the spring is compressed and expanded. The second casing 166 has a pair of parallel connecting members 168 at one end, each of which has a bore 170 positioned such that a single pin (not shown) can be passed through both connecting members. The first casing 164 has one connecting member 172 with a bore 174 passing therethrough.

As shown in FIG. 2, when the gripper assembly 102 is assembled, surface 140 of pivot member 106 is positioned between connecting members 168 and a pin (not shown) is passed through bores 170 and 154 (FIGS. 21 and 17, respectively) to pivotally connect the spring to the pivot member 106. Connecting member 172 is disposed within slot 76a of setting component 64 (FIG. 19), and another pin (not shown) passes through bores 74a (FIG. 19) and 174 (FIG. 21) to pivotally connect the spring to the setting component 64.

Figure 16:
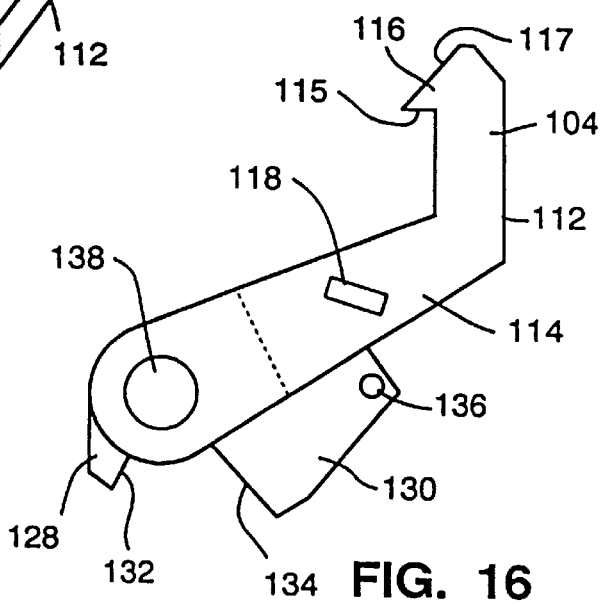

Referring to FIGS. 2 and 5, a tension spring 110 is pivotally connected at one end to peg 156 which is located on surface 142 of pivot member 106 and at the other end to peg 136 located on pivot cam 130 of gripper arm 104 (FIG. 16).

Figure 12:
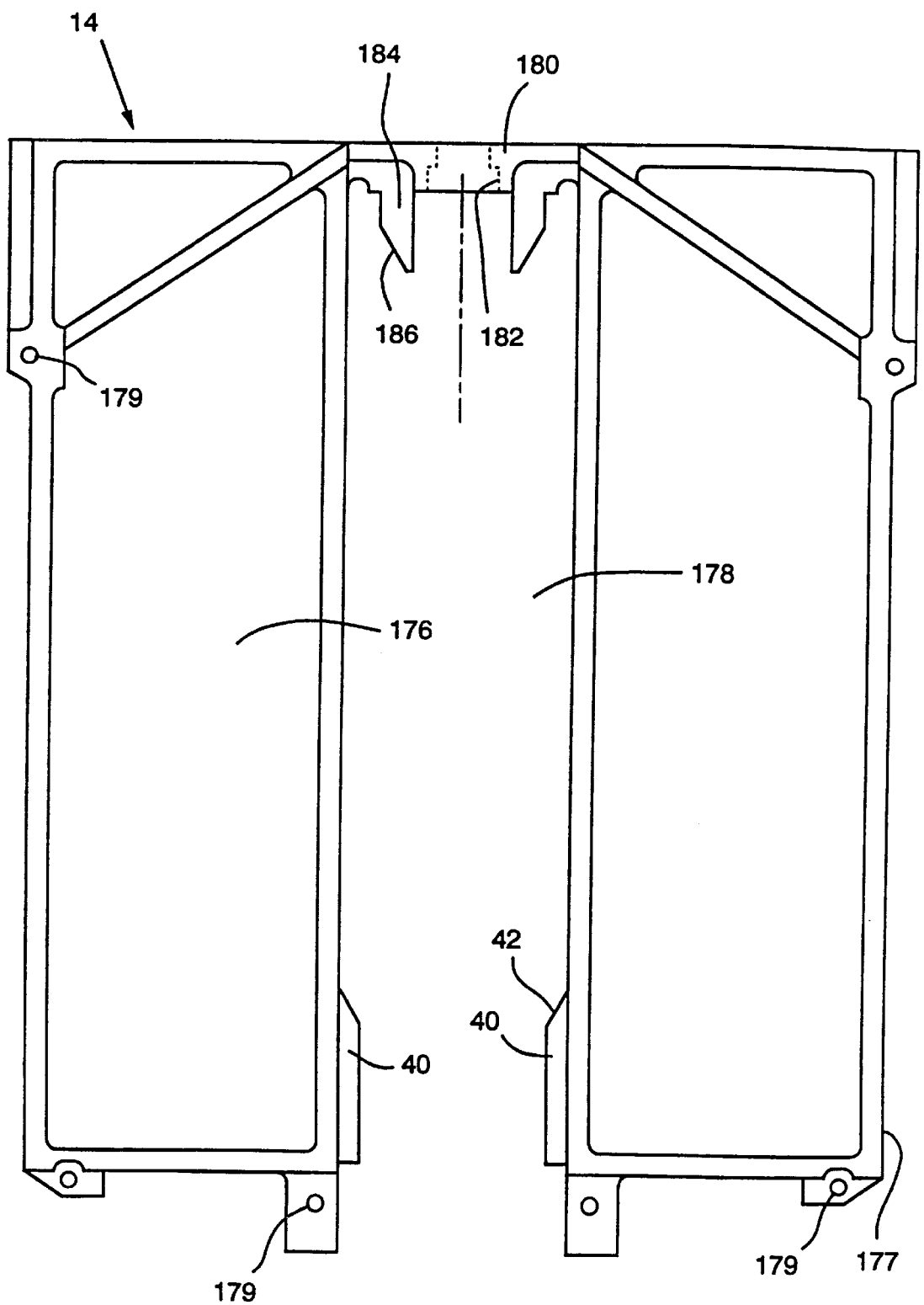
FIG. 12 is a top plan view of the top plate of the preferred cartridge engagement system of FIG. 2.

As shown in FIG. 12, the top plate 14 consists of a rectangular plate 176 having a longitudinal cut out section 178. At the distal end of the top plate is a mount 180 (see FIG. 1) for receiving the worm screw 46 (not shown in FIG. 12). A first pair of longitudinally extending camming members 40 are positioned on opposing sides of cutout section 178 at the proximal end 177 of top plate 14. Each camming member 40 has a beveled edge 42 at its distal end. Secured to the distal end of the top plate 14 and longitudinally extending within the cut out section 178 are a second pair of camming members 184 having beveled ends 186. The camming members 184 are parallel to each other and are centered within the cutout section 178.

Several holes 179 are spaced along the perimeter of the top plate 14. Referring to FIG. 1, top plate 14 is mounted on base 10 such that the worm screw receiver 56 and mount 54 on carriage 12 protrude through cut out section 178. Screws (not shown) are passed through holes 179 (FIG. 12) on the top plate into the bores 35 (FIG. 11) on the base 10 to secure the top plate to the base. One end of the worm screw 46 is disposed in the bore 182 of worm screw mount 180 and the other end is disposed within the worm screw mount 44.

Operation

The preferred embodiment will be more easily understood when described with reference to its use. For use, the apparatus is positioned facing a vertical array 202 of cartridges 204 as shown in FIG. 1. The apparatus should be mounted to an apparatus that will transport it between cartridge locations and disk reader locations.

The starting configuration of the gripper arm assemblies 100, 102 is that in which the gripper arms 104 are biased for passively engaging a cartridge 200. The gripper arm assemblies 100, 102 are shown in their starting configuration in FIGS. 4 and 5. For the gripper arms 104 to be properly biased for gripping, the setting components 64, 66 must be in their first position, meaning that there is a gap between portion 69b and wall 82a. When the setting components 64, 66 are configured this way, spring 108 is pushed laterally of the setting components 64, 66 to cause pivot member 106 to pivot around post 62 such that camming wall 152 (see FIG. 17) of the gripping member 106 pushes outwardly against surface 134 on pivot cam 130 of the gripper arm 104 to inwardly bias the gripper arm.

When in the starting configuration, the carriage 12 is advanced to the distal end of the base 10 as shown in FIG. 4. Because of the inward bias of the gripper arm 104 in the starting configuration, the gripper arms 104 do not press laterally against walls 28 of the base 10. For the same reason, the gripper arms 104 do not protrude through the space 36 between the walls 28 and the beveled cam 34 when the carriage is advanced past the ends 32 of the walls 28 as can be seen in FIG. 2.

Advancing the carriage to the distal end 26 of the base 10 causes the gripper arms to protrude from the distal end 26 of the base 10. When the gripper arms reach the cartridge 12, the beveled surfaces 117 of the hooks 116 abut the tabs 218 of the cartridge, which cause them to pivot slightly outward (against their bias) around pivot post 62 until the hooks 116 advance past tabs 218 and then snap inward in accordance with their bias such that hooks 116 become engaged with the notches 216.

The carriage is next withdrawn in the proximal direction as indicated by arrows in FIG. 5. As the carriage travels along the base 12, surface 115 of each hook 116 pushes against interior surface 222 of its corresponding notch to pull the cartridge into the sleeve 18.

As shown in FIG. 6, as the carriage approaches the proximal side 24 of the base 10, the camming walls 72a, 72b on the setting components 64, 66 collide with the longitudinally extending camming members 40 that are fixed to the proximal end of the base 10. The collision causes the setting components 64, 66 to be pushed laterally inward to their second position as indicated by arrows in FIG. 6, and to thereby overcome the magnetic force between magnet 80 and magnetic bar 90. The separation between portion 69b of setting component 66 and wall 82a of setting component 64 is thereby closed and the setting components 64, 66 are held in their new positions by the magnetic force between magnet 80 and magnetic bar 88.

As the setting components 64, 66 move into the second position, shown in FIG. 6, compression spring 108 is moved laterally inward towards setting components 64, 66, causing pivot member 106 to pivot inwardly around pivot post 62. When pivot member 106 rotates, it causes gripper arm 104 to rotate with it by virtue of spring 110 which is connected to both the gripper arm 104 and the pivot member 106, causing the gripper to become outwardly biased as shown in FIG. 6.

The cartridge engaging apparatus is next positioned forward of a disk reader or other disk location into which the cartridge is to be ejected. To eject the cartridge into the new location, the carriage 12 is advanced in the distal direction. The gripper arms 104 are in sliding contact with the walls 28 due to their outward bias, and the distal side 59 of the wall 58 on carriage 12 pushes the cartridge distally out of the sleeve 18.

Figure 7:
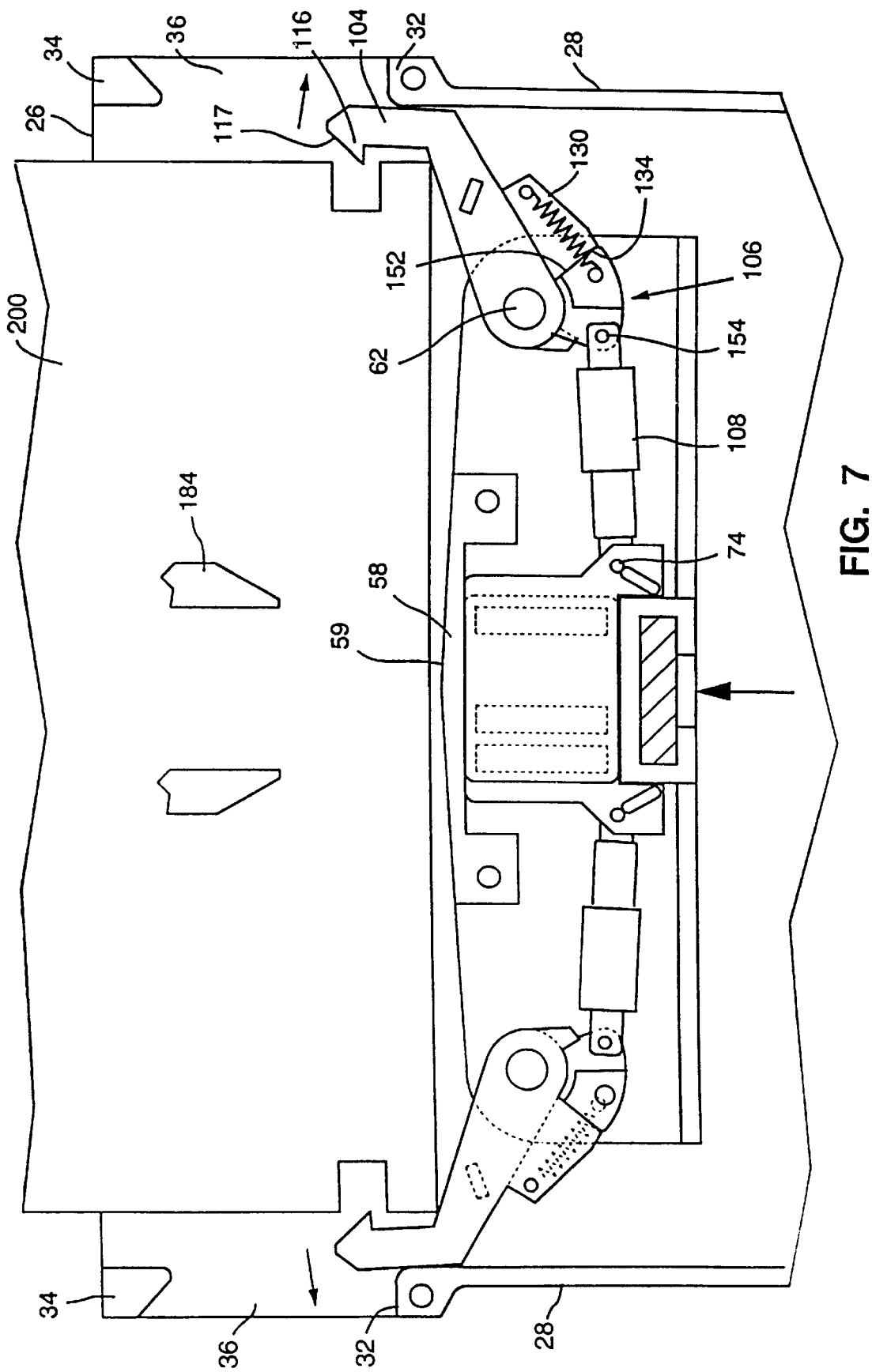
Figure 8:
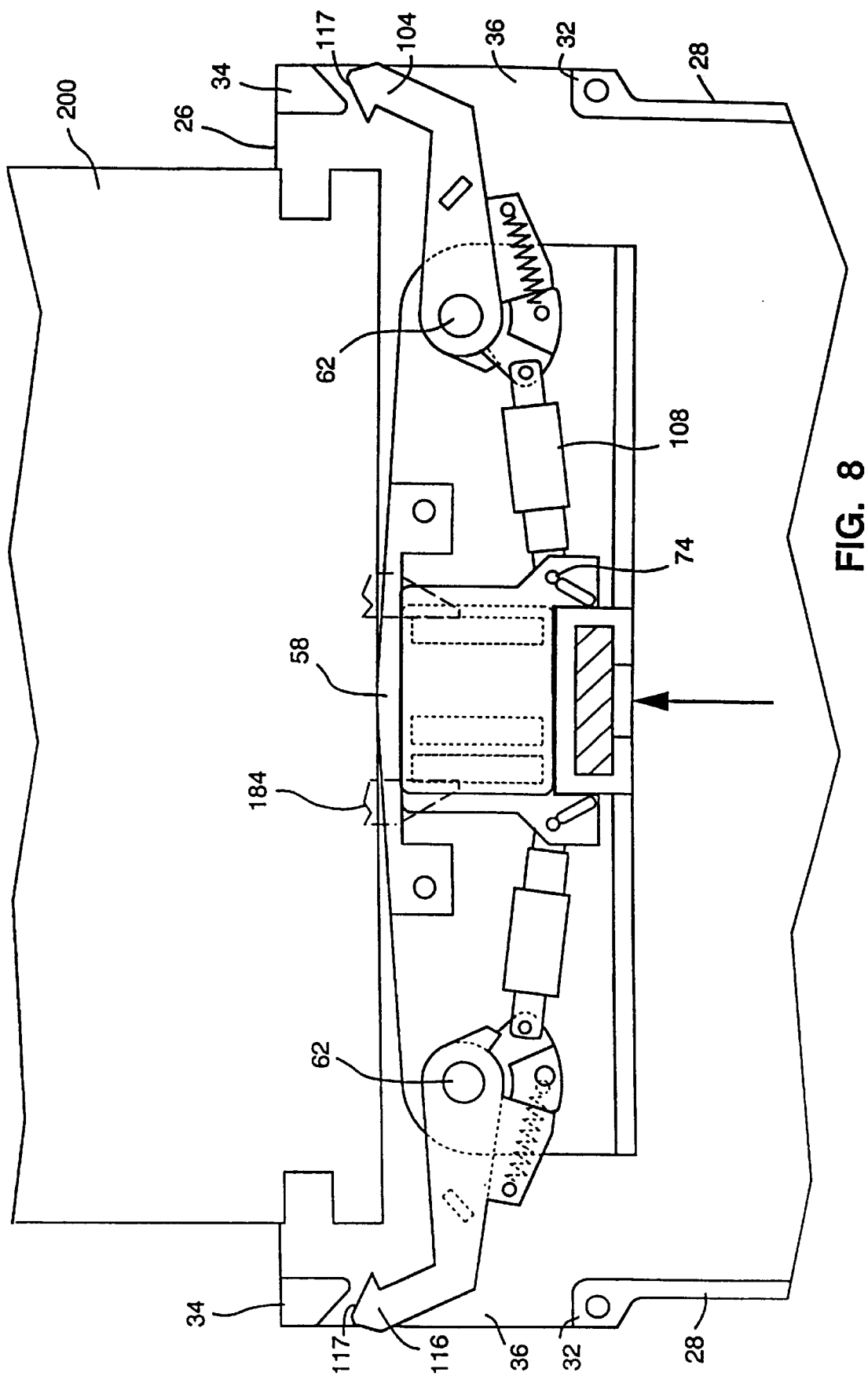
Figure 9:
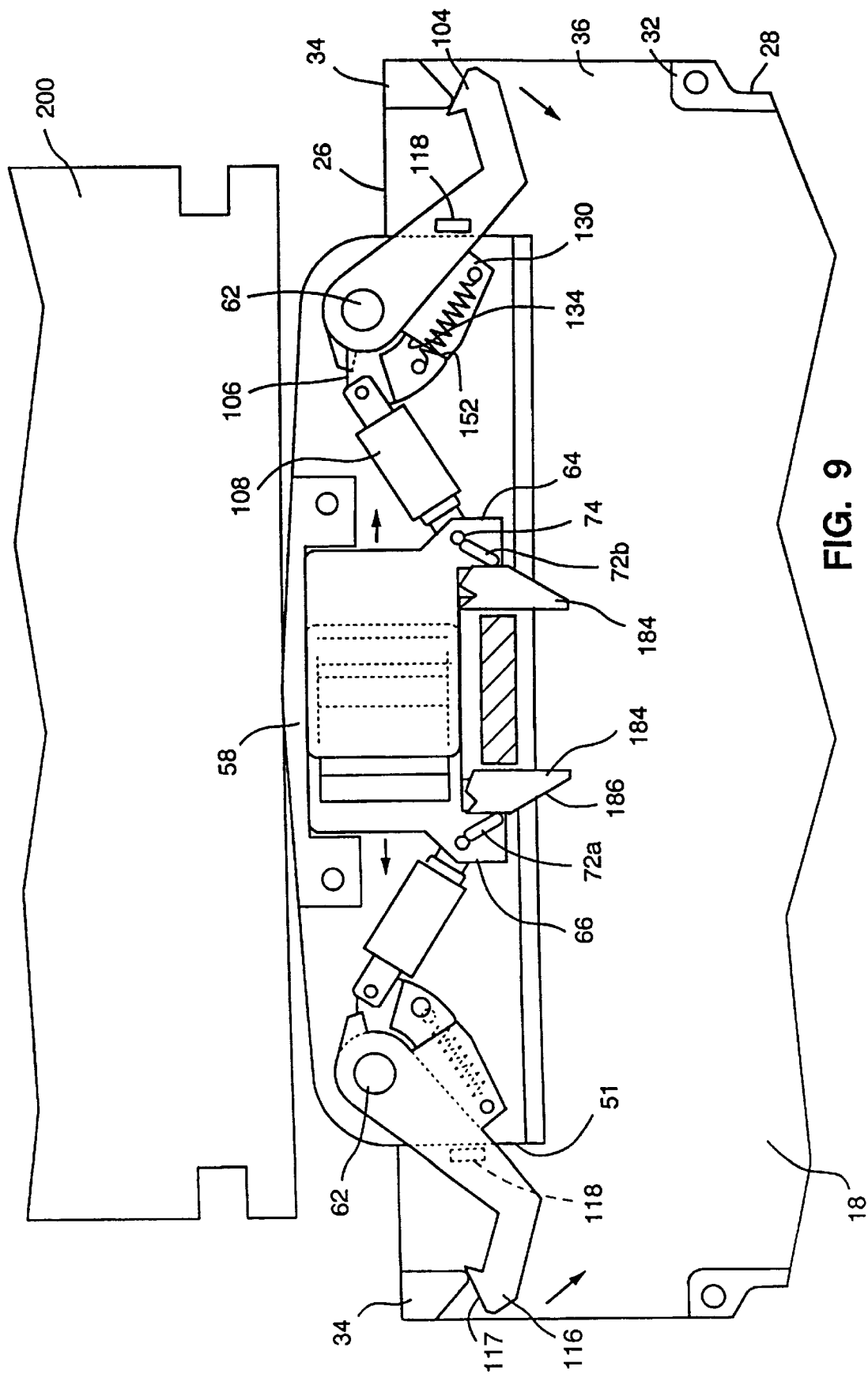

When the gripper arms 104 reach the distal ends of the walls 28, they pass through the spaces 36 between the distal ends of the walls and the beveled cams 34 as indicated by arrows in FIG. 7. The beveled surfaces 117 of hooks 116 engage with the beveled cams 34 as shown in FIGS. 8 and 9, causing the gripper arms to pivot about pivot post 62 into a laterally extending position. This causes camming surface 134 of pivot cam 130 (FIG. 16) to push against camming wall 152 of the pivot member 106 (FIG. 17), thereby compelling rotation of pivot member 106 around pivot post 62 and further causing spring 108 to pivot around pivot point 74. The angled stops 118 on the gripper arms engage with sides 51, 51a of the carriage 12 and the carriage plate 13 (FIG. 14B), respectively, to stop rotation when the gripper arms reach the orientation shown in FIG. 9. Once the gripper arms 104 are moved into the laterally extending position, the carriage 12 is able to continue its longitudinal travel slightly beyond the distal end 26 of the base and to therefore push the cartridge 200 completely out of the cartridge-receiving sleeve 18.

After the gripper arms 104 have been pivoted into the laterally extending position and while the carriage 12 is pushing the cartridge 200 out of the sleeve, the setting components 64, 66 are reset to their spaced first position. This occurs when camming members 72a, 72b are driven by the forward travel of the carriage 12 into contact with the beveled surfaces 186 of longitudinally extending members 184 connected to top plate 14 (FIG. 12) and thereby press setting components 64, 66 back into the first position as indicated by arrows. By resetting the setting components 64, 66, the longitudinally extending members 184 are performing the preliminary step needed to place the gripper arms 104 back in the biasing condition needed for gripping and are thereby preparing the gripping arms for picking up another cartridge or for retrieving the first cartridge from a disk reader.

Figure 10:
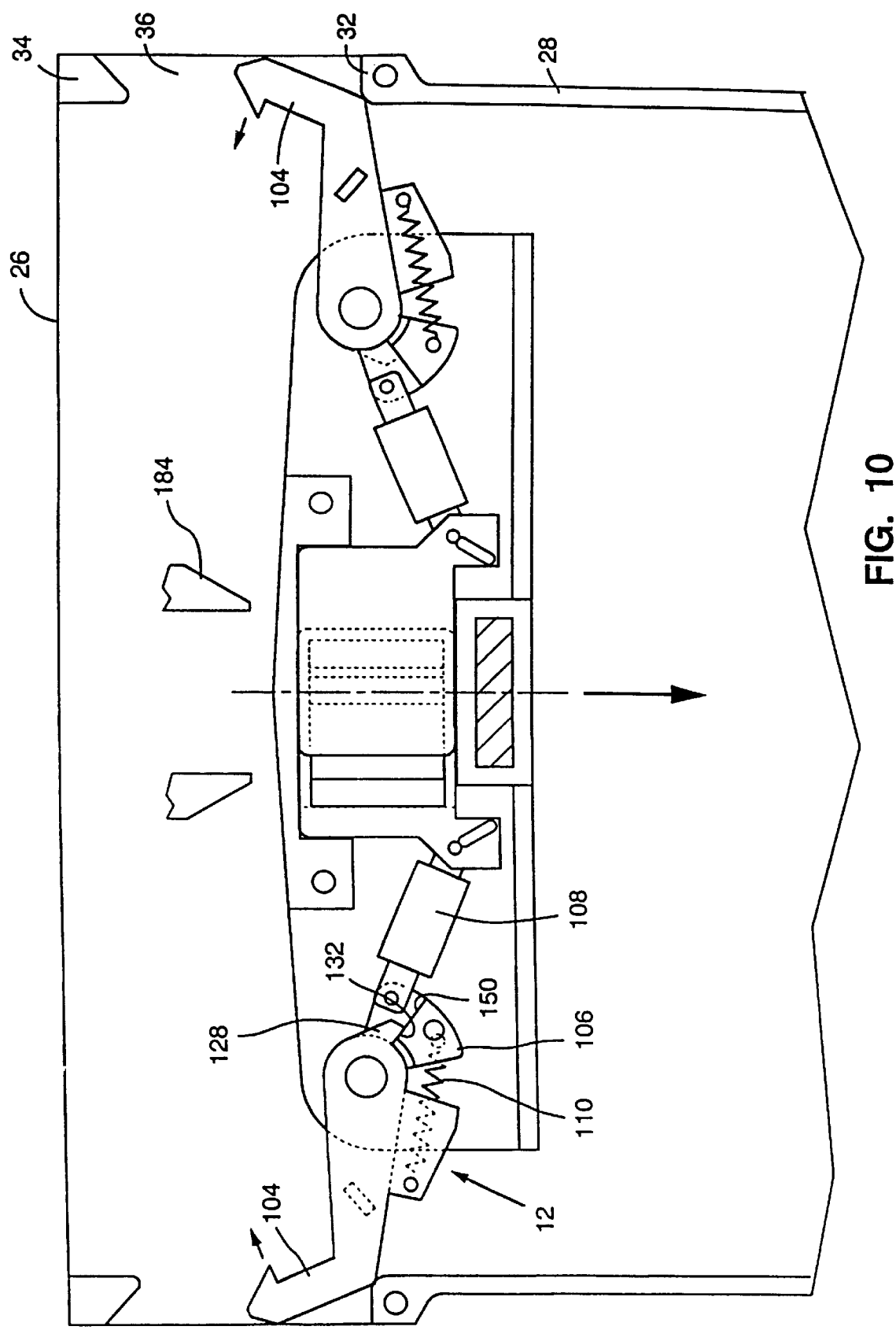

To finally place the gripper arms in the proper bias condition for gripping another cartridge, the carriage 12 is moved longitudinally in the proximal direction until the gripper arms 104 collide with the ends 32 of the longitudinal walls 28 of the base as shown in FIG. 10. The gripper arms 104 are thereby rotated back into the distally extending position shown in FIG. 2. As the gripper arms 104 are rotating back into the distally extending position, the camming wall 132 on each gripper arm pushes the camming wall 150 of its respective pivot member 106 to rotate the pivot member in the same direction as the gripper arm and to thereby re-position the spring 108 into the orientation shown in FIG. 2. The spring 110 connected between pegs 136 and 156 of the gripper arm and the pivot member (see FIGS. 15 and 17), respectively, prevents abrupt rotation of the gripper arm by expanding during initial movement of the gripper arm from the laterally extending position into the distally extending position and by subsequently contracting as the pivot member 106 pivots behind the gripper arm. With the gripper arms 104 back in the distally extending position, the apparatus is again in the starting configuration and is thus prepared for engaging another cartridge.

I claim:

1. An apparatus for retrieving and maneuvering a cartridge, the apparatus comprising:

a carriage slidable along a longitudinal path;

a pair of gripping arms movably mounted to the carriage and extending from it, each gripping arm having engaging means for engaging the cartridge;

biasing means for subjecting the gripping arms to:
 a first biasing condition in which the gripping arms are resiliently biased in a first direction for engaging the cartridge with the engaging means, and
 a second biasing condition in which the gripping arms are resiliently biased in a second direction for releasing the cartridge; and setting means for selectively setting the biasing condition of the biasing means for gripping or releasing the cartridge.

2. An apparatus for retrieving and maneuvering a cartridge according to claim 1, wherein the setting means automatically changes the biasing condition of the biasing means from the first biasing condition to the second biasing condition at one end of the longitudinal path and from the second biasing condition to the first biasing condition at another end of the longitudinal path.

3. The apparatus of claim 1, wherein:

the gripper arms are pivotable between a distally extending orientation and a laterally extending orientation in which the gripper arms protrude laterally of the carriage in opposite directions; and the apparatus further comprises camming means for pivoting the gripper arms from the distally extending orientation to the laterally extending orientation during distal movement of the carriage and for pivoting the gripper arms from the laterally extending orientation to the distally extending orientation during proximal movement of the carriage.

4. The apparatus according to claim 3, further comprising a housing for the carriage, the housing being box shaped and having a pair of parallel sidewalls, the cartridge being movable longitudinally within the housing and wherein the camming means constitute edges of openings in the housing sidewalls.

5. The apparatus of claim 4, wherein:

the carriage is slidable within the housing so that when the gripper arms are in the second biasing condition, the gripper arms protrude through the openings in the side walls as the carriage is advanced distally past the openings.

6. An apparatus for retrieving and maneuvering a cartridge having a pair of substantially parallel sides and a catch surface on a proximal portion of each side, the apparatus comprising:

a carriage slidable along a longitudinal path;

a pair of gripping arms pivotally mounted to the carriage and extending from it, each gripping arm having a hooked portion proportioned for engagement with the catch surface on the cartridge;

biasing means for subjecting the gripping arms to:
 a first biasing condition in which the gripping arms are resiliently biased laterally inwardly such that when advanced by the carriage into abutment with the cartridge, the hooked portions of the gripping arms are capable of deflecting laterally outwardly around the proximal portion of the cartridge sides and deflecting laterally inwardly into engagement with the catch surfaces, and
 a second biasing condition in which the gripping arms are resiliently biased laterally outwardly for releasing the cartridge; and setting means for selectively setting the biasing condition of the biasing means for gripping or releasing the cartridge.

7. An apparatus for retrieving and maneuvering a cartridge according to claim 6, wherein the setting means automatically changes the biasing condition of the biasing means from the first biasing condition to the second biasing condition at one end of the longitudinal path and from the second biasing condition to the first biasing condition at another end of the longitudinal path.

8. The apparatus of claim 6, wherein:

the gripper arms are pivotable between a distally extending orientation and a laterally extending orientation in which the gripper arms protrude laterally of the carriage in opposite directions; and the apparatus further comprises camming means for pivoting the gripper arms from the distally extending orientation to the laterally extending orientation during distal movement of the carriage and for pivoting the gripper arms from the laterally extending orientation to the distally extending orientation during proximal movement of the carriage.

9. The apparatus according to claim 8, further comprising a housing for the carriage, the housing being box shaped and having a pair of parallel sidewalls, the cartridge being movable longitudinally within the housing and wherein the camming means constitute edges of openings in the housing sidewalls.

10. The apparatus of claim 9, wherein:

the carriage is slidable within the housing so that when the gripper arms are in the second biasing condition, the gripper arms protrude through the openings in the side walls as the carriage is advanced distally past the openings.

11. A method of retrieving and unloading a cartridge using a cartridge retrieving device having a carriage longitudinally slidable along a base and further having a pair of pivotable gripper arms mounted to the carriage, the method comprising the steps of:

(a) positioning the cartridge retrieving device proximally of a cartridge;

(b) positioning the gripper arms to extend distally of the carriage;

(c) resiliently biasing the gripper arms laterally inward;

(d) sliding the carriage in a distal direction to cause each gripper arm to abut a proximal portion of the cartridge;

(e) sliding each gripper arm around a corner of the cartridge until it deflects inwardly in accordance with the inward bias to engage with a notch on the cartridge;

(f) sliding the carriage in a proximal direction to pull the cartridge along the base;

(g) resiliently biasing the gripper arms laterally outward to disengage the notches; and (h) with the gripper arms outwardly biased, sliding the carriage in a distal direction such that the carriage pushes the cartridge off of the base.

12. The method of claim 11, wherein step (h) further comprises the step of pivoting the gripper arms to extend laterally of the carriage.

* * * * *